United States Patent [19]

Komori

[11] 4,415,392
[45] Nov. 15, 1983

[54] METHOD FOR PRODUCING FOAMED PLASTIC SHEET

[75] Inventor: Tetsuo Komori, Utsunomiya, Japan

[73] Assignee: Japan Styrene Paper Corporation, Tokyo, Japan

[21] Appl. No.: 94,888

[22] Filed: Nov. 16, 1979

[30] Foreign Application Priority Data

Nov. 20, 1978 [JP] Japan ................................ 53-142311
Nov. 22, 1978 [JP] Japan ................................ 53-143539

[51] Int. Cl.³ ...................... B29D 23/04; B32B 31/18
[52] U.S. Cl. ............................ 156/244.13; 156/244.14; 156/244.18; 156/244.19; 156/244.27; 156/267
[58] Field of Search .............. 156/244.13, 244.14, 156/244.18, 244.19, 244.27, 267; 264/45.1, 45.4, 45.9, 46.1, 46.3, 51, 54

[56] References Cited

U.S. PATENT DOCUMENTS

| 3,094,449 | 6/1963 | Sisson | 156/244.14 |
| 3,159,698 | 12/1964 | Suh et al. | 156/244.14 |
| 3,486,196 | 12/1969 | Klenk et al. | 156/244.14 |
| 3,932,569 | 1/1976 | Fuss | 264/51 |

FOREIGN PATENT DOCUMENTS 994610 6/1965 United Kingdom ........... 156/244.14

Primary Examiner—Caleb Weston

[57] ABSTRACT

A method for producing a foamed plastic sheet which comprises heating and kneading a thermoplastic synthetic resin composition containing a blowing agent in an extruder, extruding the resulting gel through a circular die provided at the end of the extruder, and pinching the tubular foamed extrudate with a pair of pinch rolls while it is still in the softened state to adhere the inside wall of the foamed tubing to itself, is characterized in that said pinching and adhesion are performed by using a pair of pinch rolls having a width at least 5% smaller than the width of the tubular foamed extrudate extruded in the flattened state so that non-adhered parts are formed at both side end portions of the pinched foamed sheet in the widthwise direction and the inside of the non-adhered parts communicates with the open air.

5 Claims, 7 Drawing Figures

METHOD FOR PRODUCING FOAMED PLASTIC SHEET

This invention relates to a method for producing a foamed plastic sheet. More specifically, it relates to an improvement in a method for producing a plate-like foamed plastic sheet which comprises extruding a gel of a foamable synthetic resin containing a blowing agent through a circular die provided at the end of an extruder, and pinching the tubular foamed extrudate with a pair of pinch rolls having a width at least 5% smaller than the tubular foamed extrudate in the flattened state while it is still in the softened state to adhere its inside surface to itself.

A method is known to produce a foamed plastic sheet in flat form by extruding a gel of a foamable plastic composition comprising a thermoplastic synthetic resin such as polystyrene and a volatile blowing agent such as butane through a circular die provided at the end of an extruder, and pinching the tubular foamed extrudate with a pair of pinch rolls while it is still in the softened state to adhere its inside surface to itself (see, for example, U.S. Pat. No. 3,804,684). This method is useful for the production of a plate-like sheet having a thickness of 2 to 20 mm which is difficult to make by a method which involves incising the tubular foamed extrudate obtained by using a circular die. To produce a plate-like foamed sheet stably for a long period of time by this method, technical problems inherent to it should be solved.

The most frequently encountered drawbacks in the actual production of plate-like foamed sheets by this method are that the tubular foamed extrudate is liable to be distorted and cannot be obtained in a predetermined configuration and a uniform thickness, and that the melt-adhered surface of the inside surface of the tubular foamed extrudate is susceptible to delamination owing to incomplete adhesion.

There are various causes for these troubles. One of them is the fluctuation of the pressure of the air forced into the inside of the tubular foamed extrudate. This is due to the partial dissipation of the gasified blowing agent during the foaming of the resin, which gas adds to the air already forced into the closed space within the foamed tubing.

As a means for solving this problem, Japanese Laid-Open Patent Publication No. 1057/73 suggests a method for maintaining the pressure of the inside of the tubing constant by using a molding device equipped with a control means for the pressure of the inside of the tubular foamed extrudate. This method, however, has the defect that the apparatus is complicated.

It is an object of this invention therefore to provide a method capable of controlling the fluctuation of the pressure of the air forced into the foamed tubing, and maintaining the forming and adhering of the tubular foamed extrudate in the best condition.

The object of this invention is achieved by an improved method for producing a foamed plastic sheet which comprises heating and kneading a thermoplastic synthetic resin composition containing a blowing agent in an extruder, extruding the resulting melt through a circular die provided at the end of the extruder, and pinching the tubular foamed extrudate with a pair of pinch rolls while it is still in the softened state to adhere the inside surface of the foamed tubing to itself; characterized in that said pinching and adhesion are performed by using a pair of pinch rolls having a width at least 5% smaller than the width of the tubular foamed extrudate in the flattened state so that non-adhered parts are formed at both side end portions of the pinched foamed sheet in the widthwise direction and the inside of the non-adhered parts communicates with the open air.

Since non-adhered parts are formed at both side portions of the flattened foamed sheet, the gas inside the tubular foamed extrudate is released into the open air through the non-adhered portions in the step of forming the plate-like foamed sheet from the tubular foamed extrudate, and therefore, the inner pressure of the tubular foamed extrudate can be controlled to bring about the advantages described hereinbelow.

In the method of this invention, a mixture of 30 to 90 mole% of a volatile blowing agent having a solubility parameter (to be referred to as an SP value) of 7.0 to 8.0 and 70 to 10 mole% of a volatile blowing agent having an SP value of at least 6.0 but less than 7.0 can be conveniently used as the blowing agent. The use of such a mixed blowing agent makes it possible to effect fully satisfactory foaming. The foaming is uniform, and a tubular foamed extrudate having a predetermined configuration can be formed without distortion. Moreover, as a result of using the mixed blowing agent, when the tubular foamed extrudate is pinched with a pair of pinch rolls into a flat plate-like sheet, the inside surface of the tubing can be adhered to itself to provide a good and strong bonding.

There has been a prior example in which two or more blowing agents are used to increase the expansion ratio of plastic foams. We, however, fail to find any prior example in which two or more blowing agents are used together in a method comprising forming a tubular foamed extrudate and pinching it with a pair of pinch rolls to form a sheet as in the method of this invention. In addition, the mixing of blowing agents of different SP values in specified proportions is a new combination in the production of a plate-like foamed sheet by flattening a tubular foamed extrudate as in the present invention.

The method of this invention is described more specifically with reference to the accompanying drawings in which.

In the method of this invention, the step of extruding a gel of a foamable synthetic resin through a circular die provided at the end of an extruder to form a tubular foamed extrudate is the same as a conventional method which comprises introducing a synthetic resin from a hopper 2 into an extruder 1 and a blowing agent from an injection port 3 and extruding the foamable resin through a circular die provided at the end of the extruder 1. Accordingly, a detailed description of this step is omitted.

Figure 1:
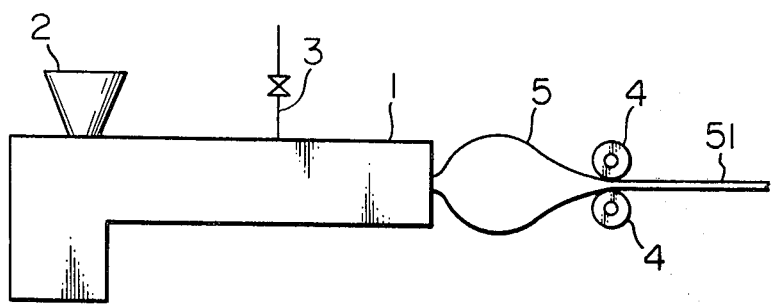
FIG. 1 is a simplified view showing the method of this invention.
Figure 2:
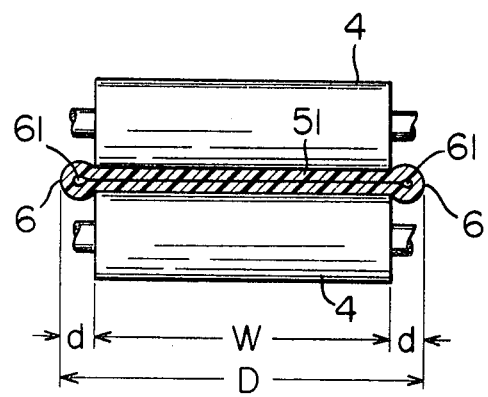
FIG. 2 is a partial view showing the formation of non-adhered parts at both side end portions of a foamed sheet by pinching the tubing with a pair of pinch rolls.

In the method of this invention, the width W of each of a pair of pinch rolls 4 for pinching a tubular foamed extrudate 5 extruded from the circular die is made smaller than the width D of the pinched tubular foamed extrudate 51 so as to provide non-adhered parts 61 at both side end portions 6 of the pinched foamed sheet, as shown in FIG. 2. Since the non-adhered parts 61 are formed continuously in the longitudinal direction of the foamed sheet, it is necessary to allow sufficient width d for the formation of end portions which are not subject to pinching, according to the thickness of the sheet. To obtain sufficient width d, it is necessary to make the width W of the pinch roll at least 5% smaller than the width D of the tubular foamed extrudate 51. Otherwise, no special pinching conditions are required.

The foamed sheet 51 delivered while having the non-adhered parts 61 at both side end portions is cut to a suitable length after leaving the pinch rolls. Thus, the tubular non-adhered parts communicate with the open air at the sites of cutting, and the gases inside the tubular foamed extrudate are gradually released into the open air through the non-adhered parts. The non-adhered parts which are not pinched are cut off later.

To better the communication between the non-adhered parts and the open air, it is preferred to break the end portions 6 by any desired method such as those illustrated hereinbelow so that the inside of the tubular foamed extrudate 5 is communicated with the open air and the gases filling the tubing 5 are released little by little into the air through the non-adhered parts 61. Breaking of the non-adhered portions can be performed by various methods. Typical methods are described below with reference to the accompanying drawings.

Figure 3:
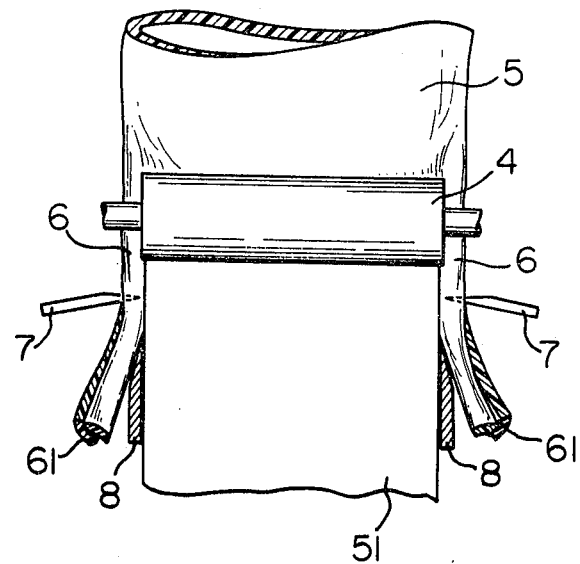
FIGS. 3 to 7 are views showing various embodiments of communicating the non-adhered parts at the both side end portions of the foamed sheet with the open air.
Figure 4:
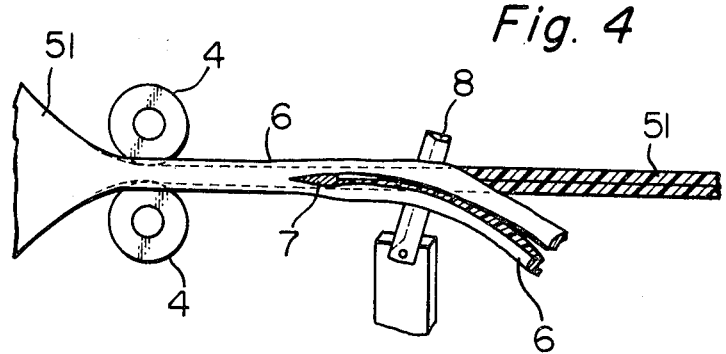

FIGS. 3 and 4 show a method comprising incising the non-adhered parts 61 formed at both side end portions 6 to communicate the non-adhered parts with the open air, and then cutting off the non-adhered parts. FIG. 3 is a top plan view showing the related part, and FIG. 4 is a side elevation thereof. The both side end portions of the plate-like foamed sheet 51 are incised by an incising knife 7 to the non-adhered parts 61 in a horizontal direction, and then the end portions are cut off by a cutter, for example a knife 8. The removed end portions 6 are crushed by any desired method at any desired site, for example by means of a shredding crusher. Furthermore, the plate-like foamed sheet 51 is cut to a suitable length to form a final product.

Figure 5:
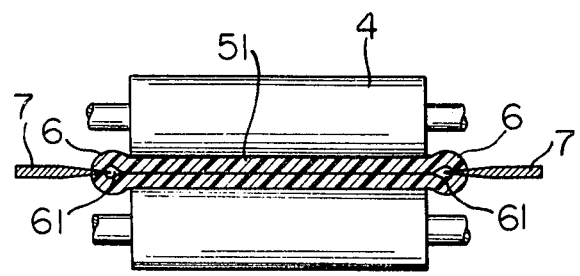
Figure 6:
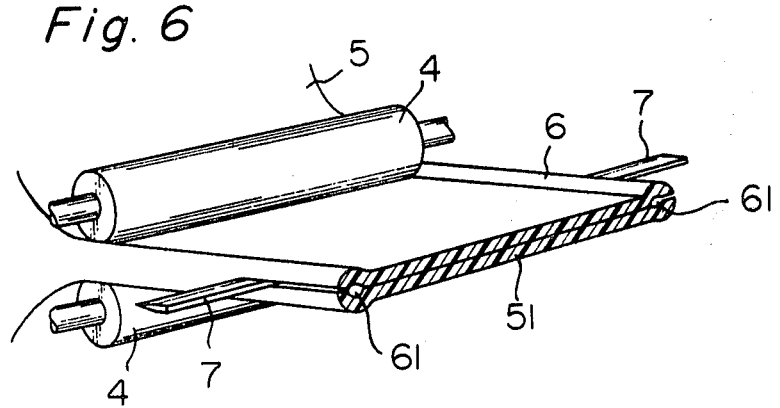

FIGS. 5 and 6 show a method which comprises incising both side end portions of the plate-like foamed sheet 51 to the non-adhered parts 61 by an incising knife 7 to communicate the non-adhered parts 61 with the open air. FIG. 5 is a front elevation, and FIG. 6 is a perspective view. The incised end portions are cut off in a subsequent step.

Figure 7:
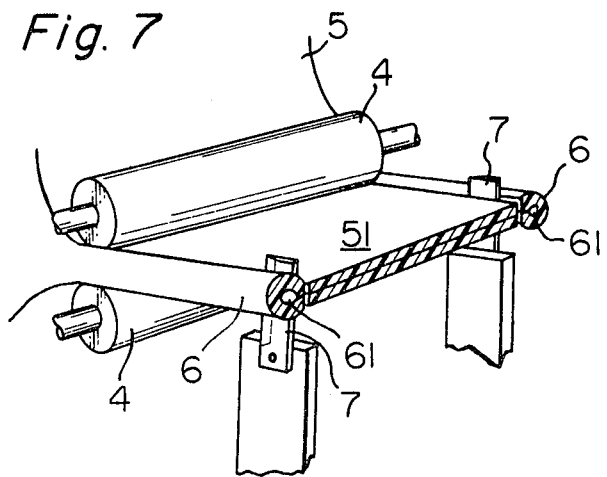

FIG. 7 is a perspective view showing a method which comprises cutting off the both side end portions 6 with a knife 8 and subsequently cutting the end portions and the plate-like foamed sheet simultaneously to the desired lengths. According to this method, the non-adhered portions 61 communicate with the open air at the cut portions. The cut end portions 6 are directly crushed by a shredding crusher at a desired site without incising the non-adhered parts 61. On the other hand, the plate-like foamed sheet 51 cut to a predetermined size is used as a final product.

Communication of the non-adhered parts with the open air is carried out preferably as early as possible after flattening the tubular foamed extrudate by pinching it with a pair of pinch rolls.

By releasing the gases inside the tubular foamed extrudate little by little into the open air, the rise of the pressure by the dissipation of the blowing agent can be prevented. The mechanism for the prevention of pressure rise is not entirely clear. It is theorized as follows, however. The non-adhered parts plays a role of an automatic flow control valve whereby the amount of the gases to be released increases with an increase in pressure and decreases with a decrease in pressure, and thus the pressure in the tubular foamed extrudate is maintained constant. As a result, the formation of the tubular foamed extrudate is carried out smoothly and stably. In addition, bubbles of gases are not stuffed into those parts of the tubular foamed extrudate which are to be adhered because no excessive rise in pressure occurs. Hence, no unevenness in adhesion occurs at the time of adhering the inside surface of the tubular foamed extrudate with a pair of pinch rolls. The quality of the tubular foamed extrudate is therefore stabilized.

The method of this invention, therefore, makes it easy to produce a plate-like foamed sheet of excellent quality which has uniformity in regard to thickness, expansion ratio, etc., and good dimensional stability and does not develop delamination of the adhered parts.

As described hereinabove, it is preferred to use a mixture of mixed blowing agent composed of a volatile blowing agent having an SP value of 7.0 to 8.0 and a volatile blowing agent having an SP value of at least 6.0 but less than 7.0.

Examples of suitable volatile blowing agents having an SP value of 7.0 to 8.0 are shown below.

|  | SP value |
| --- | --- |
| n-Pentane | 7.0 |
| Trichlorotrifluoroethane | 7.2 |
| Trichlorofluoromethane | 7.5 |
| Dichloromonofluoromethane | 8.0 |

Examples of blowing agents having an SP value of at least 6.0 but less than 7.0 are as follows:

|  | SP value |
| --- | --- |
| Dichlorodifluoromethane | 6.1 |
| Dichlorotetrafluoroethane | 6.2 |
| Propane | 6.2 |
| n-Butane | 6.6 |

In the method of this invention, the mixing ratio of these blowing agents must be within the specified range given hereinabove. If the proportion of the blowing agent having a lower SP value exceeds 70 mole%, distortion and poor adhesion of the tubular foamed extrudate tend to occur. If, on the other hand, the proportion of this component is less than 10 mole%, the expansion ratio is low and the product obtained is soft and has low dimensional stability.

The amount of the mixed blowing agent is 0.015 to 0.200 mole per 100 g of the resin.

Specific examples of the thermoplastic synthetic resin that can be used in this invention include polystyrene, high impact polystyrene, and copolymers of styrene and other copolymerizable vinyl monomers such as a styrene/maleic anhydride copolymer of a styrene/acrylate copolymer.

Addition of the blowing agent to the thermoplastic synthetic resin and the extrusion of the resin composition can be effected by known conventional methods, and no special conditions are required. In the method of this invention, extrusion needs not to be carried out at such a high temperature as to cause rupture of cells within the tubular foamed extrudate as is the case with a conventional method, because the selection of the specified combination of blowing agents renders the inside surface of the tubular foamed extrudate essentially easy to adhere.

According to the method of this invention described hereinabove, there can be easily produced a plate-like foamed sheet of excellent quality which has uniformity in regard to thickness, expansion ratio, etc., and good dimensional stability and does not develop delamination of the adhered portions.

As required, a sheet of paper, etc. may be laminated to one or both surfaces of the plate-like foamed sheet obtained by the method of this invention.

The following examples illustrate the present invention.

EXAMPLES 1 TO 3 AND COMPARATIVE EXAMPLES 1 AND 2

Polystyrene was fed into an extruder having a diameter of 90 mm through a material feeding hopper. Each of the mixed blowing agents shown in Table 1 was fed into the extruder through a blowing agent injecting port. They were heated and mixed to form a foamable polystyrene gel containing the blowing agent. The gel was extruded at 145° C. through a circular die having a slit with a diameter of 225 mm and a thickness of 1 mm. The resulting tubular foamed extrudate was pinched with a pair of pinch rolls having a width of 915 mm and disposed at a position 1000 mm away from the end of the circular die to form a plate-like foamed sheet having a width of 970 mm and including non-adhered parts at both side end portions. The non-adhered parts were then cut off at a point 27.5 mm from the side edge, and crushed.

The resulting plate-like foamed sheet had a thickness of 5 mm, an expansion ratio of about 12, and the characteristics shown in Table 1.

For comparison, the above procedure was repeated except that a pair of pinch rolls having a width of 1000 mm were used instead of the pinch rolls used in the above procedure, and the tubular foamed extrudate was pinched along its entire width without forming non-adhered parts at its end portions. The results are also shown in Table 1.

TABLE 1

|  | Mixed blowing agent | | | | Plate-like foamed sheet | | |
| --- | --- | --- | --- | --- | --- | --- | --- |
|  | Constituents | Amount (moles) (*) | Mixing ratio (mole %) | Total amount (moles) | Adhesion of the inside surface | Appearance | Compression strength (kg/cm$^2$) |
| Example |  |  |  |  |  |  |  |
| 1 | Trichlorofluoromethane | 0.030 | 50 | 0.060 | Excellent | Excellent | 3.8 |
|  | Butane | 0.030 | 50 |  |  |  |  |
| 2 | Trichlorofluoromethane | 0.041 | 67 | 0.061 | Excellent | Excellent | 3.2 |
|  | Propane | 0.020 | 33 |  |  |  |  |
| 3 | Trichlorofluoromethane | 0.060 | 92 | 0.065 | Good | Good | 2.0 |
|  | Butane | 0.005 | 8 |  |  |  |  |
| Comparative Example |  |  |  |  |  |  |  |
| 1 | Trichlorofluoromethane | 0.062 | 95 | 0.065 | Good | Shrinkage | 1.0 |
|  | Butane | 0.003 | 5 |  |  |  |  |
| 2 | Trichlorofluoromethane | 0.012 | 20 | 0.068 | Delamination | Shrinkage | 3.7 |
|  | Propane | 0.048 | 80 |  |  |  |  |

(*) Per 100 g of polystyrene.

What we claim is:

1. A method for producing a foamed plastic sheet which comprises heating and kneading a thermoplastic synthetic resin composition containing a blowing agent in an extruder, extruding the resulting product through a circular die to form a tubular member, compressing and flattening the foamed tubular extrudate while in the softened state to cause the inside walls thereof to self-adhere and form a sheet, the extent of said compressing, in terms of the width of said sheet, being at least 5% smaller than the width of said tubular member in the flattened state, thereby forming on the outer perimeters of said flattened and compressed sheet longitudinal and substantially tubular portions open to the atmosphere to vent resulting gases, and thereafter longitudinally cutting from the sheet thus formed said longitudinal, tubular portions to produce a continuous sheet of foamed plastic material.

2. The method of claim 1 wherein said thermoplastic synthetic resin is selected from the group consisting of polystyrene, high impact polystyrene, a copolymer of styrene and maleic anhydride, a copolymer of styrene/acrylate, or a mixture thereof.

3. The method of claim 1 wherein said blowing agent is a mixture of 30 to 90 mole% of a volatile blowing agent having a solubility parameter of 7.0 to 8.0 and 70 to 10 mole% of a volatile blowing agent having a solubility parameter of at least 6.0 but less than 7.0.

4. The method of claim 3 wherein the amount of said mixed blowing agent is 0.015 to 0.200 mole per 100 g of the thermoplastic synthetic resin.

5. The method of claim 3 wherein said volatile blowing agent having a solubility parameter of 7.0 to 8.0 is at least one member selected from the group consisting of n-pentane, trichlorotrifluoroethane, trichlorofluoromethane and dichloromonofluoromethane, and said volatile blowing agent having a solubility parameter of at least 6.0 but less than 7.0 is at least one member selected from the group consisting of dichlorodifluoromethane, dichlorotetrafluoroethane, propane and butane.

* * * * *